United States Patent
Su et al.

(10) Patent No.: US 9,739,799 B2
(45) Date of Patent: Aug. 22, 2017

(54) METHOD AND APPARATUS TO COMPENSATE FOR DEFLECTION ARTIFACTS IN AN ATOMIC FORCE MICROSCOPE

(71) Applicant: Bruker Nano, Inc., Santa Barbara, CA (US)

(72) Inventors: Chanmin Su, Ventura, CA (US); Shuiqing Hu, Santa Barbara, CA (US)

(73) Assignee: Bruker Nano, Inc., Santa Barbara, CA (US)

( * ) Notice: Subject to any disclaimer, the term of this patent is extended or adjusted under 35 U.S.C. 154(b) by 39 days.

(21) Appl. No.: 14/193,138

(22) Filed: Feb. 28, 2014

(65) Prior Publication Data
US 2015/0247881 A1    Sep. 3, 2015

(51) Int. Cl.
*G01Q 30/06*    (2010.01)
*G01Q 40/00*    (2010.01)
G01Q 60/34    (2010.01)

(52) U.S. Cl.
CPC ............ *G01Q 40/00* (2013.01); *G01Q 30/06* (2013.01); *G01Q 60/34* (2013.01)

(58) Field of Classification Search
USPC .............................................. 850/1
See application file for complete search history.

(56) References Cited

U.S. PATENT DOCUMENTS

| | | | |
|---|---|---|---|
| 5,266,801 A | 11/1993 | Elings et al. | |
| RE34,489 E | 12/1993 | Hansma et al. | |
| 5,329,236 A * | 7/1994 | Gemma | G01N 27/24 324/453 |
| 5,412,980 A | 5/1995 | Elings et al. | |
| 7,044,007 B2 * | 5/2006 | Struckmeier | G01Q 60/42 73/105 |
| 7,584,653 B2 * | 9/2009 | Su | B82Y 35/00 73/105 |
| 7,810,166 B2 * | 10/2010 | Struckmeier et al. | 850/21 |

(Continued)

FOREIGN PATENT DOCUMENTS

| JP | 2000241334 | 9/2000 |
|---|---|---|
| JP | 2008241618 | 10/2008 |

OTHER PUBLICATIONS

Ramos, et al., "Study of the Origin of Bending Induced by Bimetallic Effect on Microcantilever", Sensors 2007, 7, pp. 1757-1765.*

(Continued)

*Primary Examiner* — Phillip A Johnston
(74) *Attorney, Agent, or Firm* — Boyle Fredrickson S.C.

(57) ABSTRACT

A method of compensating for an artifact in data collected using a standard atomic force microscope (AFM) operating in an oscillating mode. The artifact is caused by deflection of the probe not related to actual probe-sample interaction and the method includes compensating for thermal induced bending of the probe of the AFM by measuring a DC component of the measured deflection. The DC component of deflection is identified by calibrating the optical deflection detection apparatus and monitoring movement of the mean deflection, thereby allowing the preferred embodiments to minimize the adverse effect due to the artifact. Notably, plotting the DC deflection profile yields a corresponding temperature profile of the sample.

17 Claims, 14 Drawing Sheets

(56) References Cited

U.S. PATENT DOCUMENTS

| | | |
|---|---|---|
| 8,166,567 B2 | 4/2012 | Phan et al. |
| 8,484,759 B2 * | 7/2013 | Jesse .................... B82Y 35/00 |
| | | 374/100 |
| 2008/0092640 A1 | 4/2008 | Okajima et al. |

OTHER PUBLICATIONS

Ramos, et al., "Study of the Origin of Bending Induced by Bimetallic Effect on Microcantilever", Sensors 2007, 7, 1757-1765.*
Ramos et al., Study of the Origin of Bending Induced by Bimetallic Effect on Microcantilever, Sensors 2007, 7, 1757-1765.

* cited by examiner

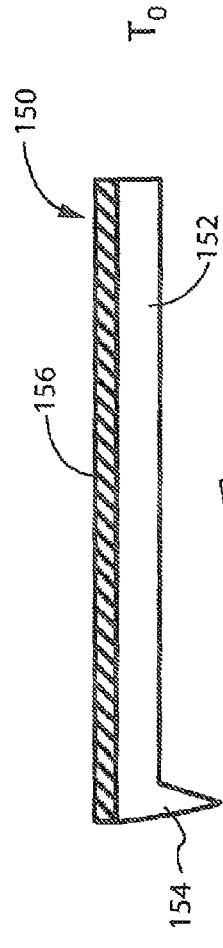
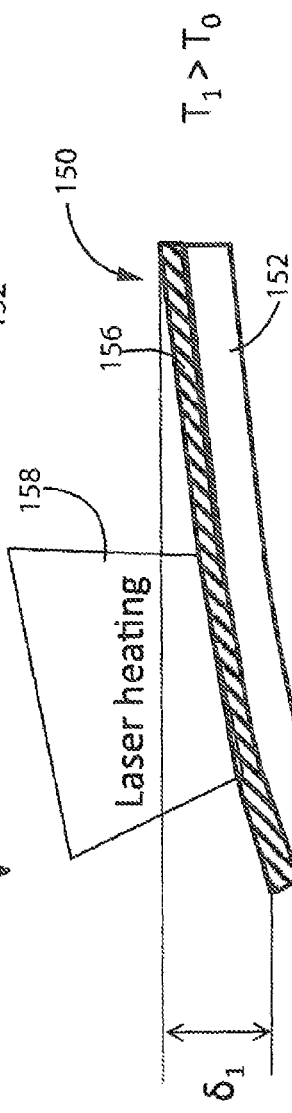
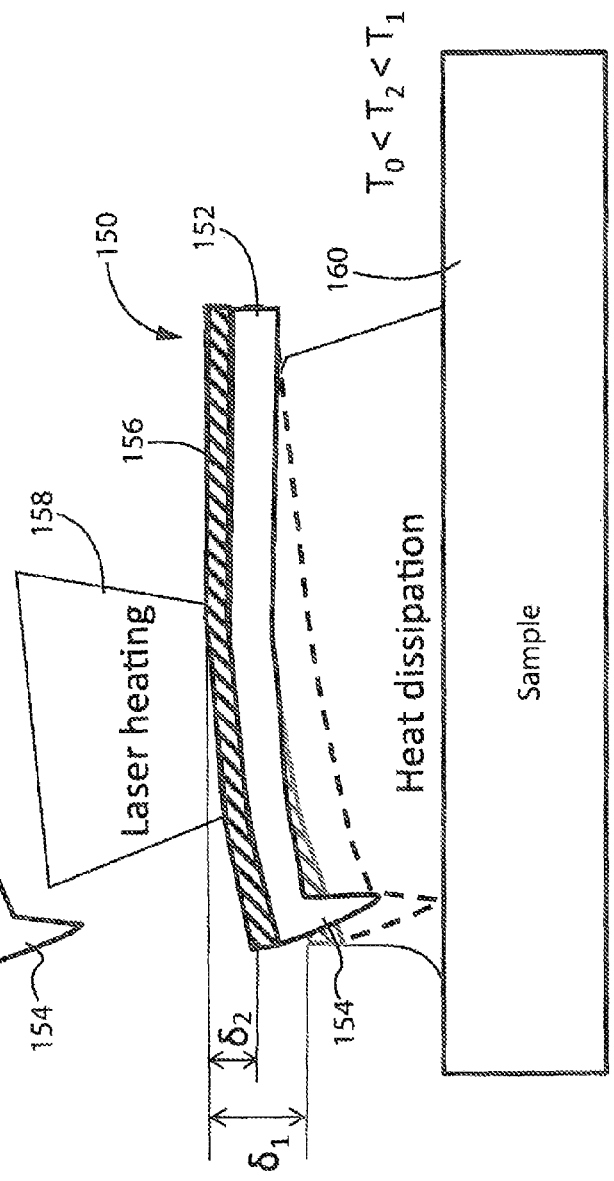
FIG. 5A
FIG. 5B
FIG. 5C

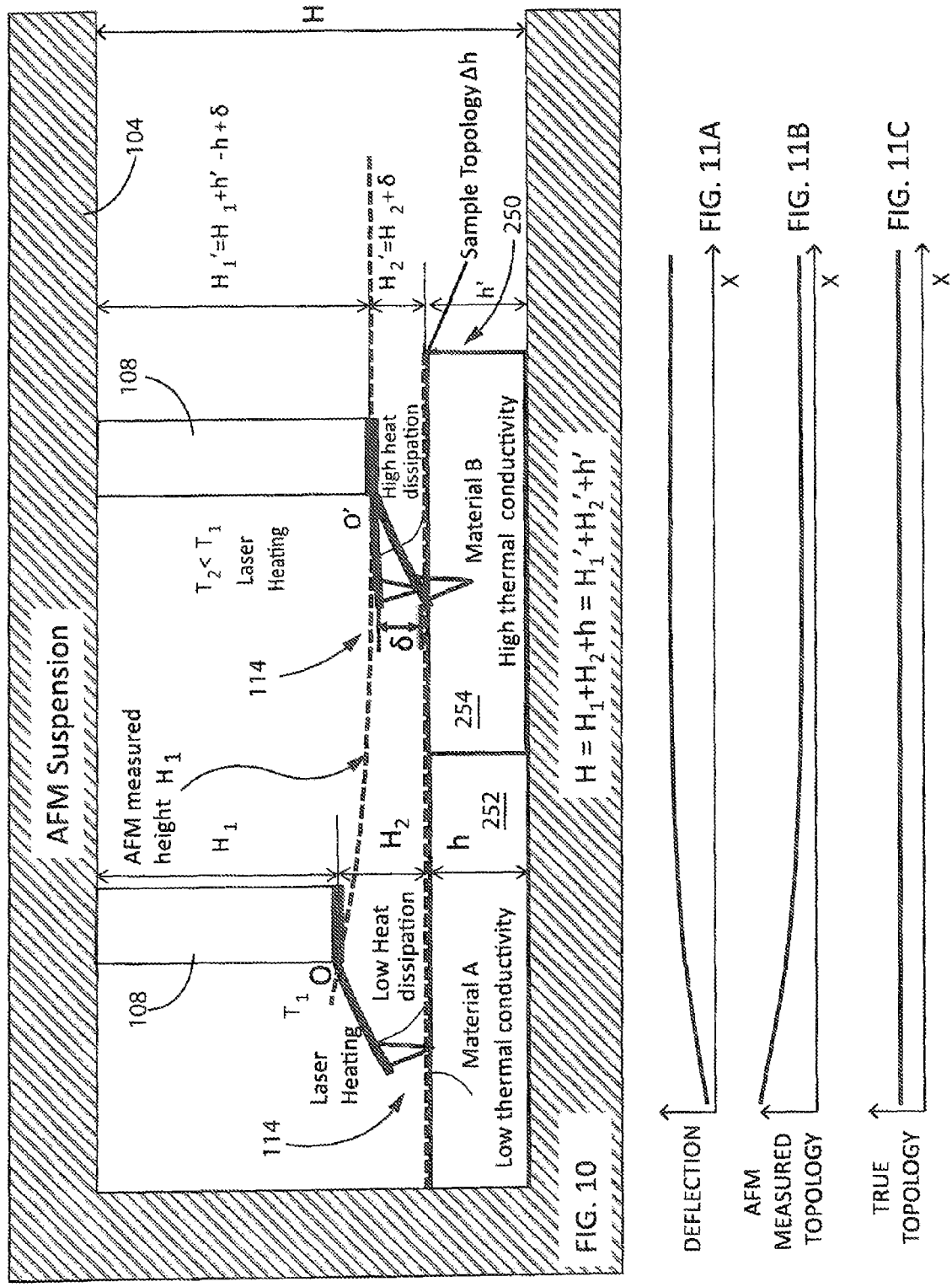

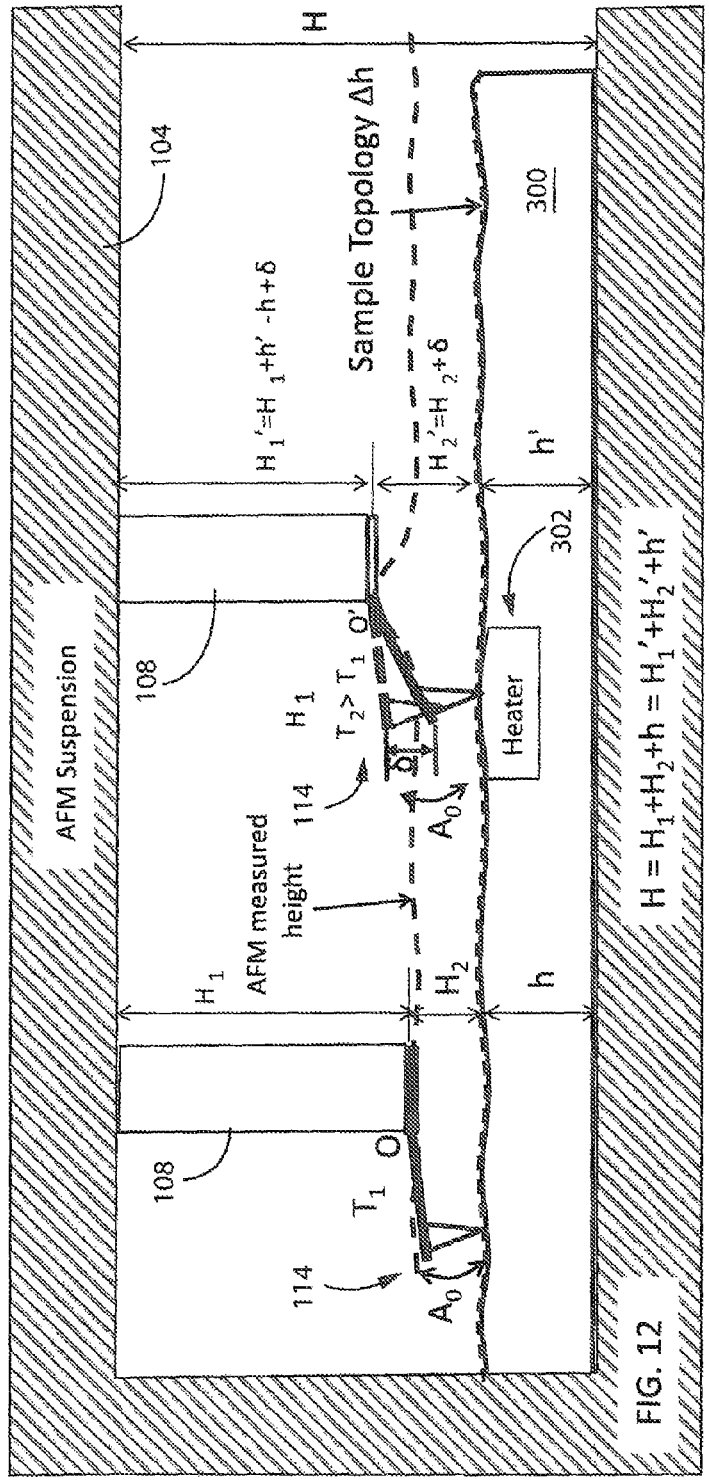
FIG. 12
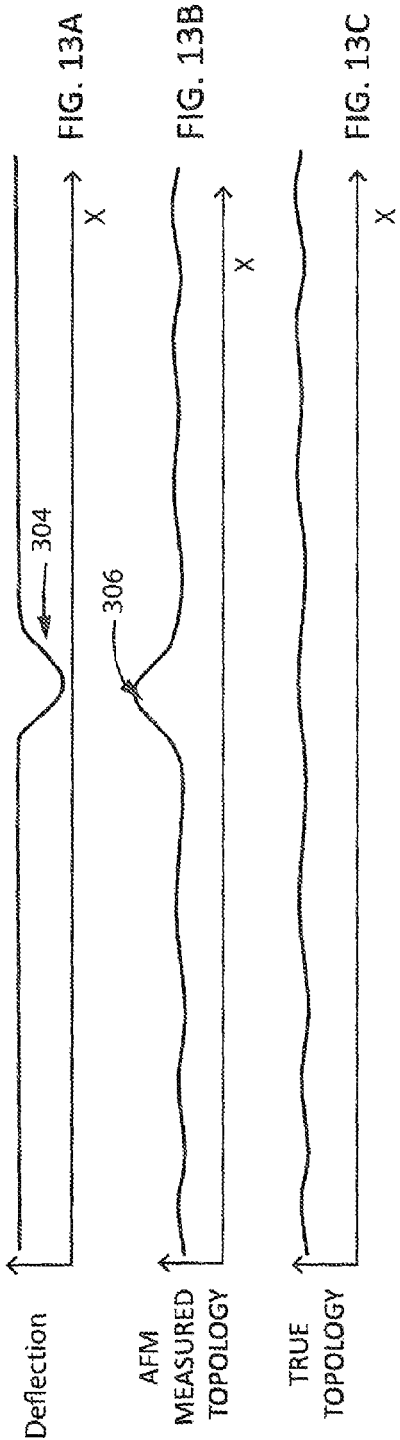
FIG. 13A
FIG. 13B
FIG. 13C

METHOD AND APPARATUS TO COMPENSATE FOR DEFLECTION ARTIFACTS IN AN ATOMIC FORCE MICROSCOPE

BACKGROUND OF THE INVENTION

Field of the Invention

The present invention is directed to scanning probe microscopes (SPMs), including atomic force microscopes (AFMs), and more particularly, to a method of compensating for deflection artifacts caused by, for example, thermal induced bending of the probe during AFM operation.

Description of Related Art

Scanning probe microscopes (SPMs), such as the atomic force microscope (AFM), are devices which typically employ a probe having a tip and which cause the tip to interact with the surface of a sample with low forces to characterize the surface down to atomic dimensions. Generally, the probe is introduced to a surface of a sample to detect changes in the characteristics of a sample. By providing relative scanning movement between the tip and the sample, surface characteristic data can be acquired over a particular region of the sample, and a corresponding map of the sample can be generated.

A typical AFM system is shown schematically in FIG. 1. An AFM 10 employs a probe device 12 including a probe 17 having a cantilever 15. A scanner 24 generates relative motion between the probe 17 and a sample 22 while the probe-sample interaction is measured. In this way, images or other measurements of the sample can be obtained. Scanner 24 is typically comprised of one or more actuators that usually generate motion in three mutually orthogonal directions (XYZ). Often, scanner 24 is a single integrated unit that includes one or more actuators to move either the sample or the probe in all three axes, for example, a piezoelectric tube actuator. Alternatively, the scanner may be a conceptual or physical combination of multiple separate actuators. Some AFMs separate the scanner into multiple components, for example an XY actuator that moves the sample and a separate Z-actuator that moves the probe. The instrument is thus capable of creating relative motion between the probe and the sample while measuring the topography or some other property of the sample as described, e.g., in Hansma et al. U.S. Pat. No. RE 34,489; Elings et al. U.S. Pat. No. 5,266,801; and Elings et al. U.S. Pat. No. 5,412,980.

Notably, scanner 24 often comprises a piezoelectric stack (often referred to herein as a "piezo stack") or piezoelectric tube that is used to generate relative motion between the measuring probe and the sample surface. A piezo stack is a device that moves in one or more directions based on voltages applied to electrodes disposed on the stack. Piezo stacks are often used in combination with mechanical flexures that serve to guide, constrain, and/or amplify the motion of the piezo stacks. Additionally, flexures are used to increase the stiffness of actuator in one or more axis, as described in application Ser. No. 11/687,304, filed Mar. 16, 2007, entitled "Fast-Scanning SPM Scanner and Method of Operating Same." Actuators may be coupled to the probe, the sample, or both. Most typically, an actuator assembly is provided in the form of an XY-actuator that drives the probe or sample in a horizontal, or XY-plane and a Z-actuator that moves the probe or sample in a vertical or Z-direction.

In a common configuration, probe 17 is often coupled to an oscillating actuator or drive 16 that is used to drive probe 17 to oscillate at or near a resonant frequency of cantilever 15. Alternative arrangements measure the deflection, torsion, or other characteristic of cantilever 15. Probe 17 is often a microfabricated cantilever with an integrated tip 17.

Commonly, an electronic signal is applied from an AC signal source 18 under control of an SPM controller 20 to cause actuator 16 (or alternatively scanner 24) to drive the probe 17 to oscillate. The probe-sample interaction is typically controlled via feedback by controller 20. Notably, the actuator 16 may be coupled to the scanner 24 and probe 17 but may be formed integrally with the cantilever 15 of probe 17 as part of a self-actuated cantilever/probe.

Often, a selected probe 17 is oscillated and brought into contact with sample 22 as sample characteristics are monitored by detecting changes in one or more characteristics of the oscillation of probe 17, as described above. In this regard, a deflection detection apparatus 25 is typically employed to direct a beam towards the backside of probe 17, the beam then being reflected towards a detector 26, such as a four quadrant photodetector. The deflection detector is often an optical lever system such as described in Hansma et al. U.S. Pat. No. RE 34,489, but may be some other deflection detector such as strain gauges, capacitance sensors, etc. The sensing light source of apparatus 25 is typically a laser, often a visible or infrared laser diode. The sensing light beam can also be generated by other light sources, for example a He—Ne or other laser source, a superluminescent diode (SLD), an LED, an optical fiber, or any other light source that can be focused to a small spot. As the beam translates across detector 26, appropriate signals are processed by a signal processing Block 28 (e.g., to determine the RMS deflection of probe 17). The interaction signal (e.g., deflection) is then transmitted to controller 20, which processes the signals to determine changes in the oscillation of probe 17. In general, controller 20 determines an error at Block 30, then generates control signals (e.g., using a PI gain control Block 32) to maintain a relatively constant interaction between the tip and sample (or deflection of the lever 15), typically to maintain a setpoint characteristic of the oscillation of probe 17. The control signals are typically amplified by a high voltage amplifier 34 prior to, for example, driving scanner 24. For example, controller 20 is often used to maintain the oscillation amplitude at a setpoint value, $A_S$, to insure a generally constant force between the tip and sample. Alternatively, a setpoint phase or frequency may be used.

A workstation 40 is also provided, in the controller 20 and/or in a separate controller or system of connected or stand-alone controllers, that receives the collected data from the controller and manipulates the data obtained during scanning to perform data manipulation operating such as point selection, curve fitting, and distance determining operations. The workstation can store the resulting information in memory, use it for additional calculations, and/or display it on a suitable monitor, and/or transmit it to another computer or device by wire or wirelessly. The memory may comprise any computer readable data storage medium, examples including but not limited to a computer RAM, hard disk, network storage, a flash drive, or a CD ROM.

AFMs may be designed to operate in a variety of modes, including contact mode and oscillating mode. Operation is accomplished by moving either the sample or the probe assembly up and down relatively perpendicular to the surface of the sample in response to a deflection of the cantilever of the probe assembly as it is scanned across the surface. Scanning typically occurs in an "x-y" plane that is at least generally parallel to the surface of the sample, and the vertical movement occurs in the "z" direction that is perpendicular to the x-y plane. Note that many samples have roughness, curvature and tilt that deviate from a flat plane, hence the use of the term "generally parallel." In this way, the data associated with this vertical motion can be stored and then used to construct an image of the sample surface corresponding to the sample characteristic being measured, e.g., surface topography. In one particularly preferred mode of AFM operation, known as TappingMode™ AFM (TappingMode™ is a trademark of the present assignee), the tip is oscillated at or near a resonant frequency of the associated cantilever of the probe. A feedback loop attempts to keep the amplitude of this oscillation constant to minimize the "tracking force," i.e., the three resulting from tip/sample interaction. Alternative feedback arrangements keep the phase or oscillation frequency constant. As in contact mode, these feedback signals are then collected, stored and used as data to characterize the sample. Regardless of their mode of operation, AFMs can obtain resolution down to the atomic level on a wide variety of insulating or conductive surfaces in air, liquid or vacuum by using piezoelectric scanners, optical lever deflection detectors, and very small cantilevers fabricated using photolithographic techniques. Because of their resolution and versatility, AFMs are important measurement devices in many diverse fields ranging from semiconductor manufacturing to biological research. Note that "SPM" and the acronyms for the specific types of SPMs may be used herein to refer to either the microscope apparatus or the associated technique, e.g., "atomic force microscopy."

When making measurements on the sub-nanometer scale, the potential for artifacts in the data is significant, and therefore system set-up and environment often must be taken into account, Again. AFM monitors the physical interaction between its probe and the sample, and thus the mechanical path between the two becomes critical, not only in its set-up but with respect to how this path reacts to its environment One cause of measurement problems is background contributions to the measured probe deflection, i.e., bending or deflection of the probe caused by factors independent of actual probe-sample interaction. Some sources of these background contributions, such as drift and creep, have been studied and solutions have been attempted with varying success. Others are not as well known. For instance, it has been discovered that adverse effects due to the difference in the thermal expansivity of the probe and sample, as well as in homogeneity of the sample itself, can lead to severely compromised AFM data.

Turning to FIGS. 2A-2C, a bimorph AFM probe 42 having a cantilever 44 and a tip 48 is shown schematically. Such probes are typically microfabricated from a wafer with the cantilever being made of silicon (Si), silicon nitride ($SiN_3$), or silicon dioxide ($SiO_2$). Disposed on the backside of cantilever 44 is a metal layer or coating 46 (for example, to create a reflective surface for the optical detection system, etc.). It is the differences in these materials that can cause the probe to bend as a bimorph. In particular, the thermal expansivity of silicon is approximately $3 \times 10^{-6}$ $K^{-1}$ (silicon and silicon nitride), and approximately $1\text{-}2 \times 10^{-5}$ $K^{-1}$ for the metal coating 46 (aluminum (Al) is about $2.22 \times 10^{-5}$ $K^{-1}$ and gold (Au) is about $1.42 \times 10^{-5}$ $K^{-1}$). At a certain temperature (e.g., ambient), $T_0$, the probe does not deflect and the artifact theoretically is not present (FIG. 2A). However, at an increase in temperature at a region of probe-sample interaction, $T_1 > T_0$, probe 42, with its bimorph properties, and in particular cantilever 44, changes its shape and bends downwardly an amount $\delta_1$ as shown in FIG. 2B, for example. At a lower temperature, $T_2 < T_0$, as illustrated in FIG. 2C, the probe bends or deflects upwardly to change its shape an amount $\delta_2$. The deltas, $\delta_1$ and $\delta_2$, are schematically shown large in FIGS. 2B and 2C for illustration purposes only. This deflection is small, in the range of sub-nanometer to 100 nm, but when resolving features on the sub-nanometer scale, as is the case in AFM, this deflection results in a deflection artifact that has a significant impact on the resultant data. Note that when referencing temperature changes, the thermal properties are dependent on the combined heat generation/absorption properties of the laser and sample.

This thermal bending or deflection artifact is schematically illustrated in FIG. 3 in connection with a probe 50 imaging an inhomogeneous sample. The resultant adverse effect is shown in FIG. 4. A schematic illustration of a cross-section of an exemplary sample 70 shows a first portion 72 and a second portion 74. These two areas 72, 74 of sample 70 comprise different materials which have different properties; in this case, different thermal conductivities (k). Second portion 74 has a higher thermal conductivity than first portion 72, thus causing a difference in the temperature at which the AFM measurement is made during imaging. This, as a result, yields a height artifact in the AFM image; namely, the image height is lower than the true height at about the second portion 74.

More particularly, because the thermal conductivity on a left hand side 72 of sample 70 is lower than on a right hand side 74, a temperature $T_1$ in a region 76 (left) of probe-sample interaction is greater than a temperature $T_2$ in a region 78 (right) of probe-sample interaction. In response, probe 50 will bend up when scanning from left to right in FIG. 3.

This change in deflection of the probe will lead to a thermal probe height change, $\delta$, in the probe-sample separation, and thus a change in the probe height (base of a probe 50 to apex of tip 54). Probe height $H_2$ on the left will be greater than probe height on the right, $H_2'$, even though the sample surface height will not have changed. This, in turn, causes AFM feedback to compensate for the decrease in probe height by sending a control signal to a Z-actuator 80 to, in this case, drive the probe down toward the sample surface. As a result, the AFM measured sample height will be lower than the actual sample height in that region of higher k. Again, this is the above-described thermal bending induced artifact in the acquired AFM data, and is shown schematically as a line of AFM data 82 that results when imaging sample 70 shown in FIG. 3. While sample 70 is generally flat, as it is imaged, the resultant data includes a thermal induced artifact, indicating a lower height at region "A" (corresponding to region 74 of sample 70 having higher conductivity). This artifact renders it difficult to determine true sample topology because the bottom of the flat sample has multiple height values. Clearly, background contributions to probe deflection, including differences in thermal expansivity of probe materials in the presence of temperature changes, and conductivity of different regions of non-homogeneous samples, etc., lead to such unacceptable artifacts. Note that when operating in an intermittent contact mode, such as TappingMode™ or PFT Mode, the position or height of the probe relative to the sample surface discussed herein (including the Z deflection change 6 due to the thermal effect) is roughly the center position of the peak-to-peak oscillation.

An example of temperature change being introduced to an AFM system is illustrated in FIGS. 5A-5C. Initially, with a large probe-separation and at a temperature $T_0$, a probe 150 having a lever 152 and a tip 154 and a metal coating 156 disposed on the lever is shown in FIG. 5A. Probe 150 does not exhibit any bimorph effect at ambient temperature. Then, when preparing for operation and with the probe still a relatively far distance from the sample surface, a laser beam 158 of the optical detection scheme is directed toward the backside of lever 152. This beam acts to heat probe 150 to a temperature, $T_1 > T_0$. This heating causes a probe bimorph effect, such as that described in connection with FIG. 3, i.e., probe 150 bends downwardly an amount $\delta_1$.

During AFM operation, the separation between probe 150 and sample 160 is reduced to cause the two to interact. As the gap between the two is narrowed, the sample surface acts as a heat sink, with the corresponding heat dissipation causing the temperature to decrease, $T_0 < T_2 < T_1$, in the region of tip-sample interaction This as a result, causes the probe to bend or deflect oppositely (upwardly) with a corresponding change in thermal deflection from $\delta_1$ to $\delta_2$, as illustrated in FIG. 5C. This thermal deflection, or background deflection, affects the measured AFM deflection and thus the measured sample height as follows. The detected upward deflection will be interpreted by the feedback loop as a decrease in sample height, when in reality no change in sample height occurred. This causes the feedback loop to narrow the probe-sample separation (via appropriate control signals to the Z actuator) and return the relative oscillating motion between the two to the AFM oscillation setpoint (TappingMode™, PFT Mode). The result is AFM data that includes an artifact showing a sample height lower than the actual or true height.

Turning next to FIGS. 6A and 6B, the above-described thermal bending artifact also impacts mechanical property measurements of sample surfaces when using AFM to generate force curves, for example, as described in U.S. Pat. No. 7,044,007 to Struckmeier et al., owned by the present Assignee. More particularly, when a sample 404 and a probe 400 including a cantilever 401 supporting a tip 402 approach one another, sample 404 may become a heat sink and dissipate beat from probe 400. Notably, probe 400 may also be heated by the laser of the optical deflection detection apparatus (described later herein—again, the combined heat generation/absorption properties of the sample and laser). The temperature of probe 400 will decrease and cantilever 401 will bend gradually upwardly when tip 402 comes close to sample 404. This causes a slope in the observed cantilever deflection 406, and erroneous force data. A solution to this thermal bending to allow the AFM to correct this induced deflection (and yield a more accurate deflection plot 408 [FIG. 6B] without the artifact) was desired.

Overall, an AFM system and method capable of removing deflection artifacts due to probe deflection caused by non-probe-sample interaction from the measured AFM data was desired.

SUMMARY OF THE INVENTION

The preferred embodiments overcome the above-noted drawbacks by monitoring the DC deflection of the probe when imaging in oscillating modes of AFM operation (e.g., tapping and PFT modes). Once the photodetector is calibrated, conventional AFM operation stays the same. By subtracting the DC deflection of the probe from the conventional AFM topography data, a true image of the sample surface free of thermal induced deflection artifacts can be obtained.

In accordance with a first aspect of the invention, a method of compensating for a deflection artifact of a probe of a scanning probe microscope (SPM) operating in an oscillating mode includes generating relative oscillating motion between a probe and a sample. The method next includes providing relative scanning motion between the probe and the sample, and detecting deflection of the probe as the probe and the sample interact during the providing step. The method then controls probe-sample proximity based on the detected motion, the controlling step generating SPM scanner measured height. Thereafter, a DC component of a cantilever shape change during the scanning step is determined, and the cantilever shape change is converted to a displacement. The method then combines (e.g., adds) the displacement with the SPM scanner measured height at each scan location to compensate for the deflection artifact, thus yielding the true topology of the sample.

In another aspect of the invention, the method includes calibrating the detector of the optical deflection detection apparatus so the actual location at which the reflected laser impinges upon the detector can be determined. This allows the AFM of the preferred embodiment to determine the DC deflection of the probe, i.e., probe deflection being caused by background factors independent of probe-sample interaction.

According to another aspect of this embodiment, the calibration includes generating a force-distance curve on a known sample so as to generate a conversion factor (nm/V).

In another aspect of this embodiment, the displacement is at least one of vertical displacement and lateral displacement.

According to yet another aspect of the invention, the controlling step includes using an intermittent contact mode of SPM operation. Preferably, the intermittent contact mode is TappingMode™, Peak Force Tapping® (PFT) mode, or torsional resonance (TR) mode.

According to another embodiment, a method of generating a temperature profile of a sample includes providing an AFM having a probe and an optical deflection detection apparatus. The method then oscillates the probe (or the sample) and performs a calibration of a detector of the deflection detection apparatus. Once complete, the method causes the probe and sample to engage, and initiates relative scanning motion between the probe and the sample to image different locations of the sample. Next, the method detects motion of the probe as the probe and the sample interact during the providing step, and controls probe-sample proximity based on the detected motion so as to generate AFM scanner measured height. Thereafter, a DC component of cantilever shape change is detected. The DC component of cantilever shape change is then converted to a temperature profile of the sample surface, According to another aspect of this embodiment, the method calibrates a detector used during the detecting step, including generating a force-distance curve on a known sample so as to generate a conversion factor (nm/V).

In another aspect of this embodiment, the displacement is at least one of vertical displacement and lateral displacement.

According to a further aspect of the invention, the controlling step includes using an intermittent contact mode of SPM operation. Preferably, the intermittent contact mode is TappingMode™, Peak Force Tapping (PFT) mode, or torsional resonance (TR) mode.

According to yet another aspect of the invention, the using step includes monitoring at least one of an amplitude of the relative oscillation near resonance and a peak force when the relative oscillation is below resonance.

These and other features and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout, and in which:

FIG. 5A is a schematic illustration of a bimorph probe at ambient temperature, $T_0$;

FIG. 5B is a schematic illustration of a bimorph probe similar to FIG. 5A, for an increased temperature condition due to laser heating, $T_1>T_0$;

FIG. 5C is a schematic illustration of a bimorph probe similar to FIG. 5A, for a decreased temperature condition due to, for example, heat dissipation from the sample, $T_0<T_2<T_1$;

FIG. 10 is a schematic diagram similar to FIGS. 7 and 8, illustrating thermal deflection or bending of the probe, and the corresponding AFM response;

FIG. 11A is a schematic plot of the DC deflection of the probe as the probe interacts with the sample from Material A to Material B in FIG. 10;

FIG. 11B is a schematic plot of AFM measured topology as the probe interacts with the sample scanning from Material A to Material B in FIG. 10;

FIG. 11C is schematic plot of the true surface topology of a heterogeneous sample as the probe interacts with the sample from Material A to Material B in FIG. 10;

FIG. 12 is a schematic diagram similar to FIG. 10, with the AFM imaging a sample with an active heat source;

FIGS. 13A-C are schematic plots similar to FIGS. 11A-C, for the case shown in FIG. 12;

DETAILED DESCRIPTION OF THE PREFERRED EMBODIMENTS

Figure 6B:
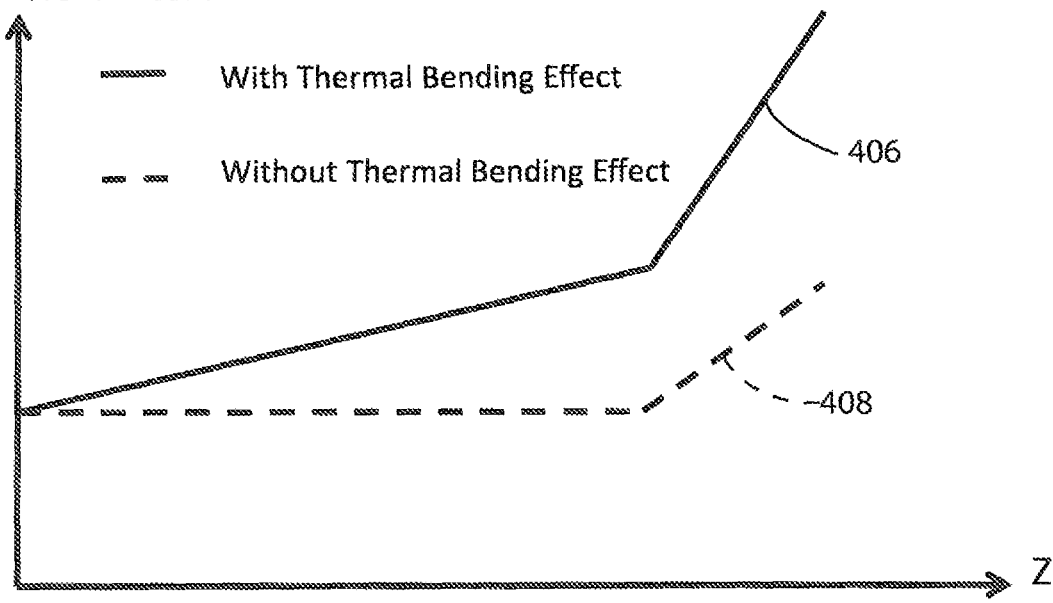
FIG. 6B is a schematic plot of deflection versus Z position (probe-sample separation) corresponding to FIG. 5A.
Figure 6A:
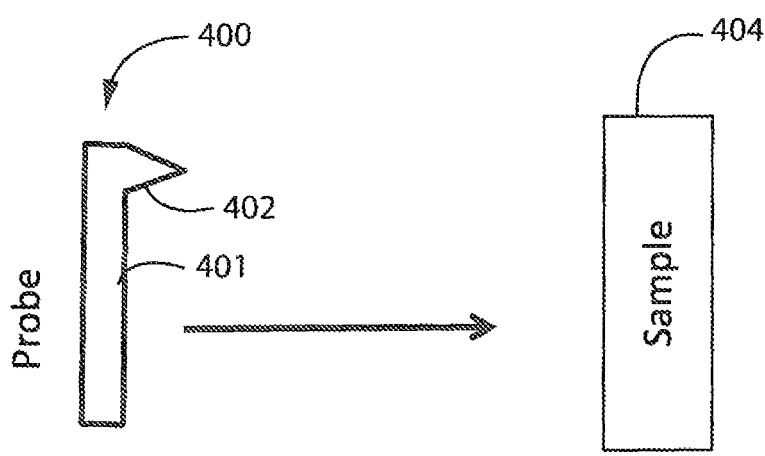
FIG. 6A is a schematic illustration of a probe being introduced to a sample at a scan location to generate a force curve.

The difference in thermal expansivity of the materials of a probe and different parts of a heterogeneous sample having, for example, differences in conductivity, causes the probe to bend, resulting in a background contribution to the measured sample topology even though the bottom point of the surface is consistent and should be represented by a relatively flat data plot in those regions. As shown in FIG. 6B and discussed above, a slope in the force data, for example, may also be seen. Ideally, these artifacts would be eliminated from the data, but before now, this has not been an easy task for AFM manufacturers. Initially, the cause of these artifacts was studied, and is illustrated and described in detail below in connection with FIGS. 7 and 8 to provide an understanding of the solution provided by the preferred embodiments.

Figure 7:
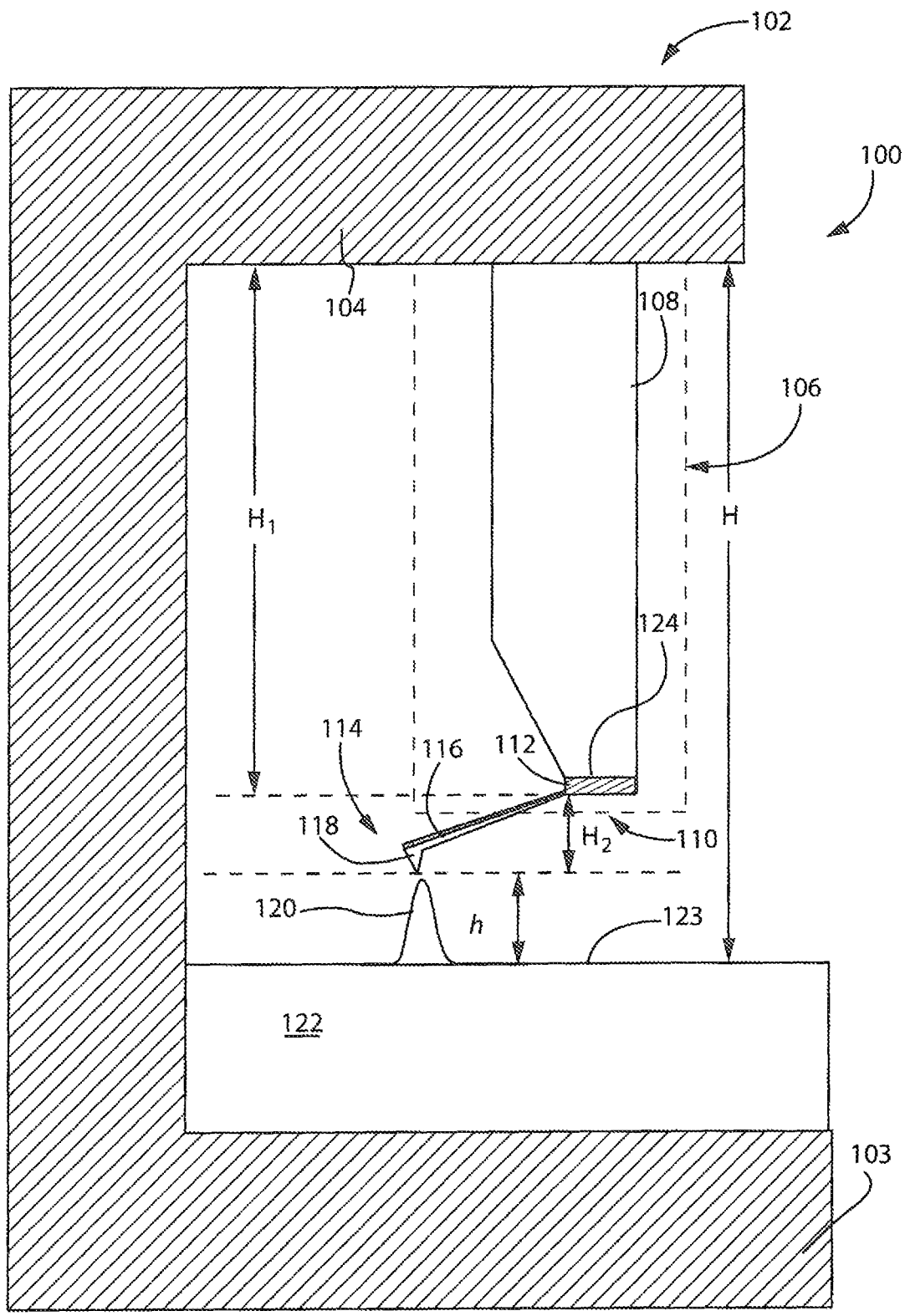
FIG. 7 is a schematic diagram of a mechanical path of an AFM.

Turning initially to FIG. 7, a schematic diagram of the mechanical loop of an atomic force microscope (AFM) 100 is shown. Generally, AFM 100 includes a superstructure or frame 102 that has an upper arm 104 that acts as an AFM suspension to support an AFM head 106. Head 106 includes, in this case, a piezoelectric tube 108 substantially fixedly coupled to frame 102 at one end. At its opposite end, tube actuator 108 supports a probe assembly 110 including a probe holder 112 that accommodates one or more probe devices 114. Each probe device 114 includes a probe base (not shown) mounted in the probe holder and from which a cantilever 116 of the probe extends. The distal end of the cantilever supports a tip 118 that typically has an Angstrom-scale tip radius at its apex. Tip 118 is configured to interact with a sample 120 mounted on a sample mount or stage 122.

In one embodiment of intermittent contact mode operation, probe device 112 is oscillated with an actuator 124 (as discussed previously with regard to FIG. 1) as probe tip 118 is introduced to the sample. As tip 118 and sample 120 interact, probe 112 deflects and an AFM feedback control scheme detects that deflection, as described above. The AFM processes the deflection using a feedback loop including an appropriate gain stage, and transmits appropriate control signals to tube actuator 108 to move the probe up and down relative to the sample surface to maintain a setpoint, e.g., a setpoint peak-to-peak or RMS amplitude.

Figure 1:
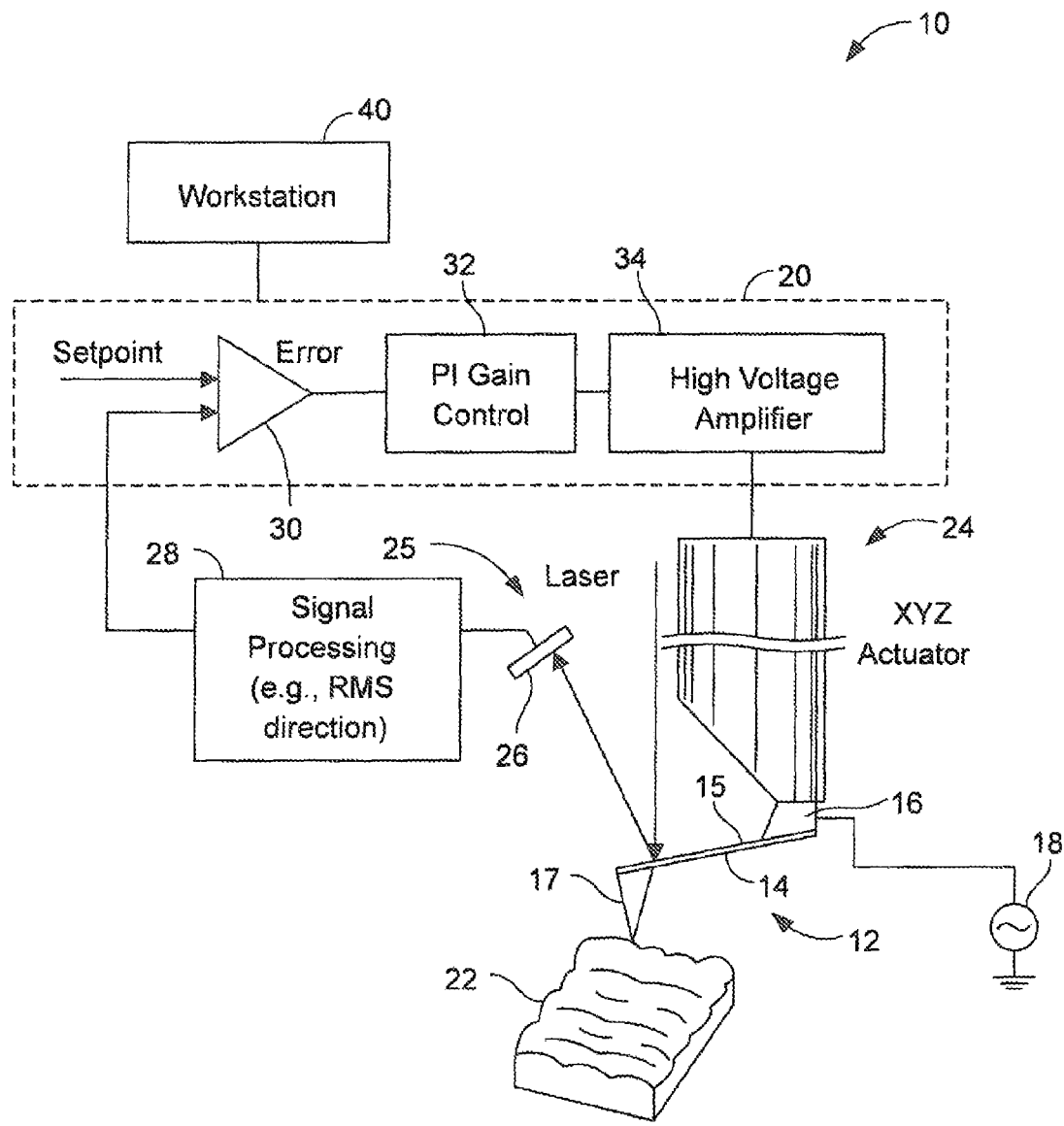
FIG. 1 is a block diagram of a conventional atomic force microscope, appropriately labeled "Prior Art"
Figure 2A:
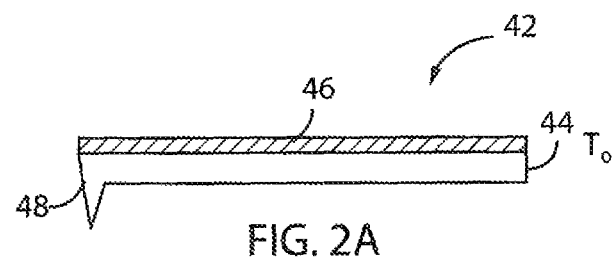
FIGS. 2A-2C are schematic illustrations of thermal induced deflection or bending of a bimorph AFM probe, including no bending at $T_0$ (FIG. 2A), vertical (Z direction) bending at an increased temperature condition, $T_1>T_0$ (FIG. 2B), and vertical bending at a decreased temperature condition, $T_2<T_0$ (FIG. 2C)
Figure 2B:
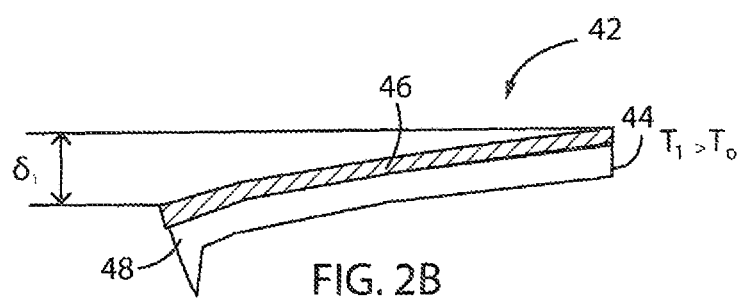
Figure 2C:
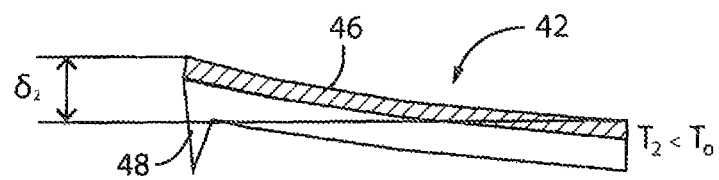

The detector itself typically includes a laser beam bounced off the back of the lever and towards a quadrant photodetector (FIG. 1). The signals used to maintain the setpoint thus provide an indication of one or more properties of the sample surface, such as topography. In known systems, because the RMS amplitude is used in feedback control, the location at which the reflected laser beam contacts the photodetector has not before been used by AFMs.

When considering the thermal effects on the AFM data, the spatial relationship of all the AFM components in the mechanical loop is important. First, the distance U is the distance between the sample 120 mount and where the AFM head 106 is fixed to superstructure/suspension/frame 102, i.e., the location of the suspension of the AFM scanner (piezo actuator). A distance $H_1$ is the AFM or scanner height, the distance between where the AFM head 106 is fixed to suspension or upper arm 104 and probe holder 112. This distance, $H_1$ changes as the AFM responds to probe-sample interaction with scanner 108. $H_2$ is the probe height, the distance between probe holder 112 (fixed end of cantilever probe device 114) and tip 118 at the distal end of cantilever 116 of probe device 114. As a result, the height of the sample "h" can be expressed as, $$H-H_1-H_2=h \qquad \text{Equation 1}$$

In a typical AFM set-up such as this, while H, the distance between the location at which actuator 108 is attached to suspension 102 and a mounting surface 123 of sample stage 122 is fixed, $H_1$, $H_2$ and h are variable.

Figure 8:
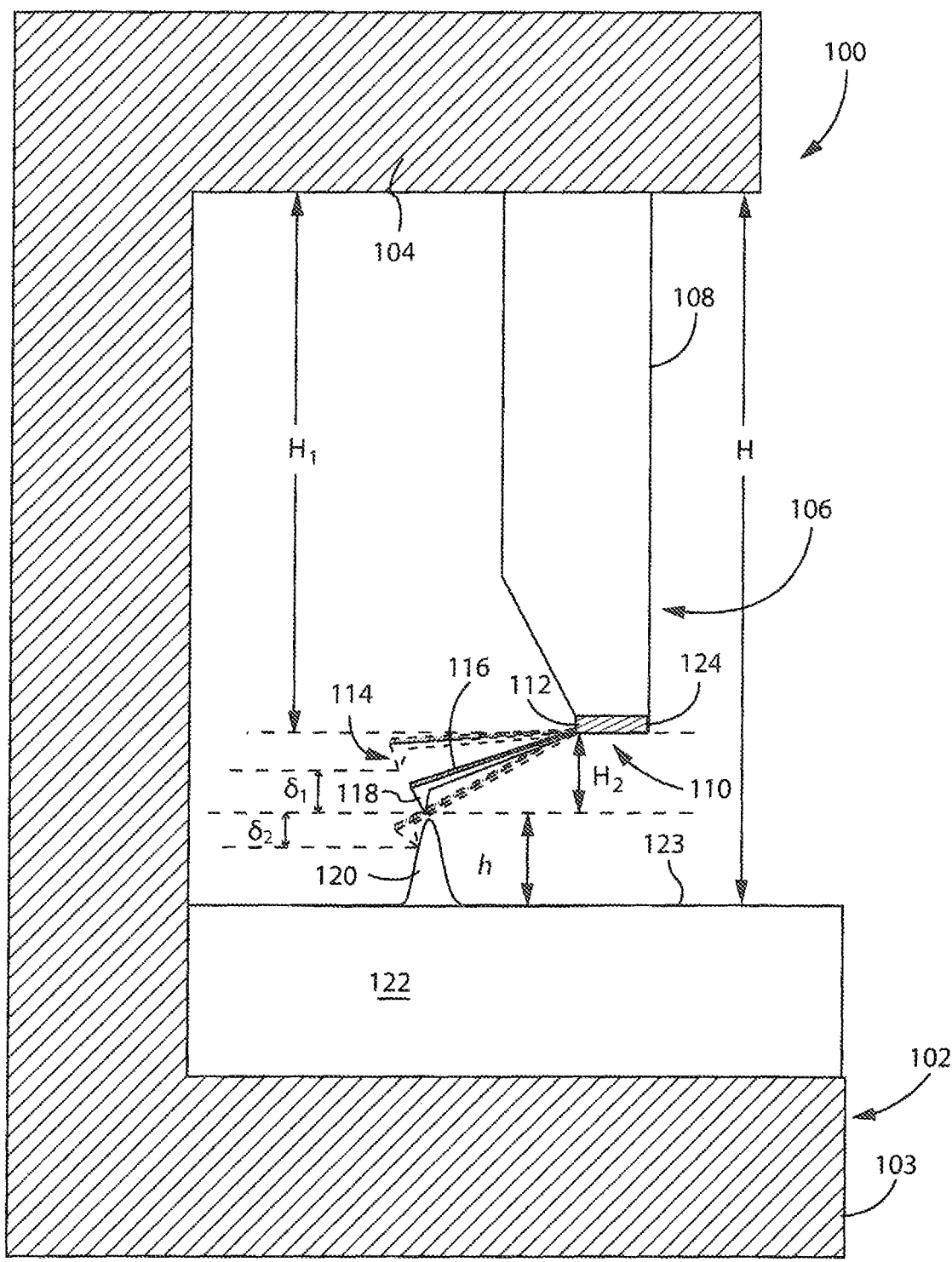
FIG. 8 is a schematic diagram of a mechanical path of an AFM similar to FIG. 7, illustrating variable probe height.

Turning to FIG. 8, while FIG. 7 illustrates an ideal case in which background contributions to deflection do not exist, FIG. 8 illustrates a more realistic scenario. In this case, with the same mechanical loop shown in FIG. 7, a background contribution to deflection due to thermal bending of the cantilever is illustrated. Again, thermal bending of the lever can be caused by disparities in the coefficients of thermal expansion between probe materials, as well as conductivity between the probe and sample, and between probe and different parts of a non-homogeneous sample.

Here, h is still the height of sample 120, and $H_1$ is the distance between the fixed end of the scanner/actuator (AFM head mount) and the probe holder 112, a quantity that is known to AFM users. However, the amount of deflection of the probe device 114 due to thermal bending is not known or easy to measure. It is illustrated in FIG. 7 as part of the mechanical loop. In particular, a distance H between suspension or upper arm 104 of superstructure 102 (the fixed end of actuator 108) and probe mount 122 supported by base 103 of superstructure includes a) a distance $H_1$ between the fixed end of actuator/scanner 108 supported by arm 104 and the probe holder 112 (fixed at free end of actuator 108), b) a distance h, the height (thickness) of sample 120, and c) a distance $H_2$, the "probe height" (which includes an amount of probe deflection caused by background contributions to deflection, e.g., the thermal effect), an unknown quantity and a quantity that may change as the probe and sample interact at different locations of the sample. The total height H can be expressed as in Equation 1, $H=H_1+H_2+h$. Importantly, the change in $H_1$, $\Delta H_1$, is representative of typical AFM topology—i.e., the signals generated by AFM feedback to maintain the feedback setpoint (amplitude, phase, frequency of oscillation) and thus control probe-sample proximity (drive the Z actuator). However, assuming $\Delta H_1$ represents true surface topology ignores the possibility of probe deflection due to background factors (probe deflection due to sources such as temperature). In other words, in standard AFM, $H_2$ is assumed to be constant and therefore any change due to Z actuator motion is attributed to a change in h. The preferred embodiments, as discussed further below, do not make this assumption and as a result are better able to generate data representative of true sample topology.

When the environment changes (temperature, and even long range electrostatic or magnetic forces as described below, etc.), such conditions will cause the cantilever to bend, and $H_2$ will change. This change, $\delta$ ($\delta_1$ corresponding to a decrease in temperature (and corresponding probe deflection upwardly), for instance, and $\delta_2$ an increase in temperature), in $H_2$ will cause a commensurate change in the AFM measured sample height, thereby yielding an artifact in the scanner measured height data. This change in probe height can be expressed as, $$\delta=(H_2'-H_2) \qquad \text{Equation 2}$$

This change 3 could be an increase in probe height (bending downwardly toward the sample due to an increase in temperature), or a decrease (bending upwardly away from the sample due to decrease in temperature, e.g., imaging a more conductive (high k) sample).

Figures 9A, 9B:
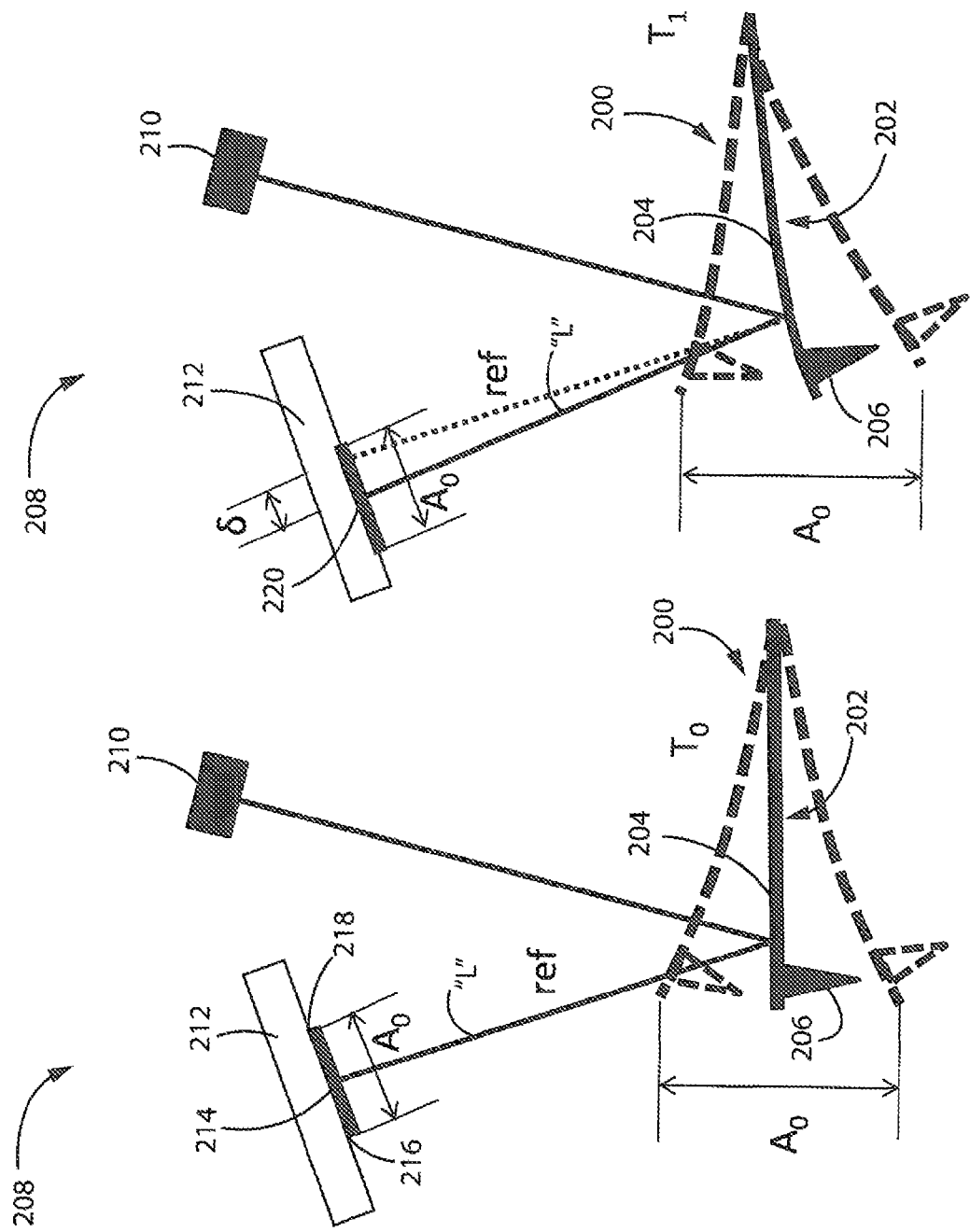
FIG. 9A is a schematic illustration of calibrating the deflection detector of an AFM according to a preferred embodiment.
FIG. 9B is a schematic illustration of determining the DC deflection of the probe to compensate for thermal induced deflection, using the calibration performed according to FIG. 9A.

The mechanism used to overcome the drawbacks associated with this thermal bending induced artifact is illustrated in FIGS. 9A and 9B. Again, in TappingMode™ or PFT Mode, the tapping amplitude (or peak interaction force) of an AFM probe device 200 is monitored using an optical deflection detection apparatus 208, shown schematically as a laser source 210 and a detector 212. In operation, probe device 200 is oscillated at an amplitude $A_0$ as laser source 210 directs a laser beam "L" toward a backside 204 of a cantilever 202 supporting a tip 206 at its distal end. Beam "L" is reflected from lever 202 and directed toward detector 212, such as a quadrant photodetector. In known TappingMode™ AFMs, the control system monitors the peak-to-peak or RMS amplitude $A_0$ and generates appropriate control signals to, for example, keep that amplitude constant. More particularly, when probe 200 interacts with the sample, the amplitude will change and the system will send a control signal to, in this case, move the probe toward or away from the sample to return the oscillation amplitude to the setpoint amplitude, $A_0$.

During system setup, the laser 210 is typically centered at about a center 214 of detector 212, as shown in FIG. 9A. As the probe oscillates, the beam traverses detector 212 between about points 216 and 218 of detector. The approximate center 214 is the reference or zero point, of probe oscillation. Importantly, in known AFMs, because amplitude is being monitored during AFM operation, the actual location at which reflected beam "L" impinges on detector 212, or its center position 214, is not considered in the control scheme.

In the preferred embodiments, however, the average or mean position of the beam is monitored and considered as follows. Turning to FIG. 9B, an illustration of thermal bending (due to laser heating, varying thermal conductance of the sample, etc.) and the present solution are provided. First, the average position of the laser beam is centered under a steady temperature condition, as shown in FIG. 9A. With this information in hand, thereafter monitoring the average position of the laser 210 on detector 212 will provide an indication of any thermal induced deflection of the probe 200. Note that while the probe 200 may bend in ambient conditions, the AFM only measures relative motion to generate its data. The photodiode of the deflection detection apparatus is calibrated to "zero" for AFM operation even though the probe may be experiencing some deflection; throughout this description, the AFM data/probe deflection is plotted flat or straight for ease of explanation.

As shown in FIG. 9B, when thermal induced deflection (downwardly due to an increase in temperature, in this case) is present, the average position of the reflected laser beam "L" will move from center position 214 (no thermal induced deflection) to a new center position 220 on detector 212. The difference in these two positions yields a δ, $\delta_{detector}$, that can be used post-scan as an offset at that scan location to correct the AFM data, or continuously, as a calibration factor, $\delta_{piezo}$, to provide a measure of the DC component of cantilever shape change, and ultimately a real time indication of the true sample surface height. The reflected laser beam "L" indicates this correction, δ, to the original center of detector shown in phantom (214 in FIG. 9A). In either case, the system is able to compensate for the thermal induced deflection of probe 200 and accurately characterize the surface without knowing the thermal conductance of the sample. Using this information, the thermal induced deflection artifact can be minimized. For measurements such as those with respect to a thermally heterogeneous sample, the benefit is substantial.

FIG. 10 is a schematic diagram of AFM operation according to the preferred embodiments when imaging a completely flat heterogeneous sample 250 with different coefficients of thermal conductivity. AFM is the same as that shown in FIGS. 7 and 8 to describe the thermal induced bending artifact. In this case, sample 250 includes a first Material A 252 on the left having low thermal conductivity and a second Material B 254 on the right having high thermal conductivity. Note that in these illustrations, fixed end of Z scanner or actuator 108 is schematically shown coupled to suspension or upper arm 104. Suspension 104 may include the AIM superstructure/support as well as what is commonly referred to as the AFM head (shown schematically as 106 in FIGS. 7 and 8). The main point is that the height between the fixed end of the Z actuator 108 (contained as part of the AFM head which itself is fixed to the superstructure) and the sample mount is known ("H" in the Figures).

Figure 3:
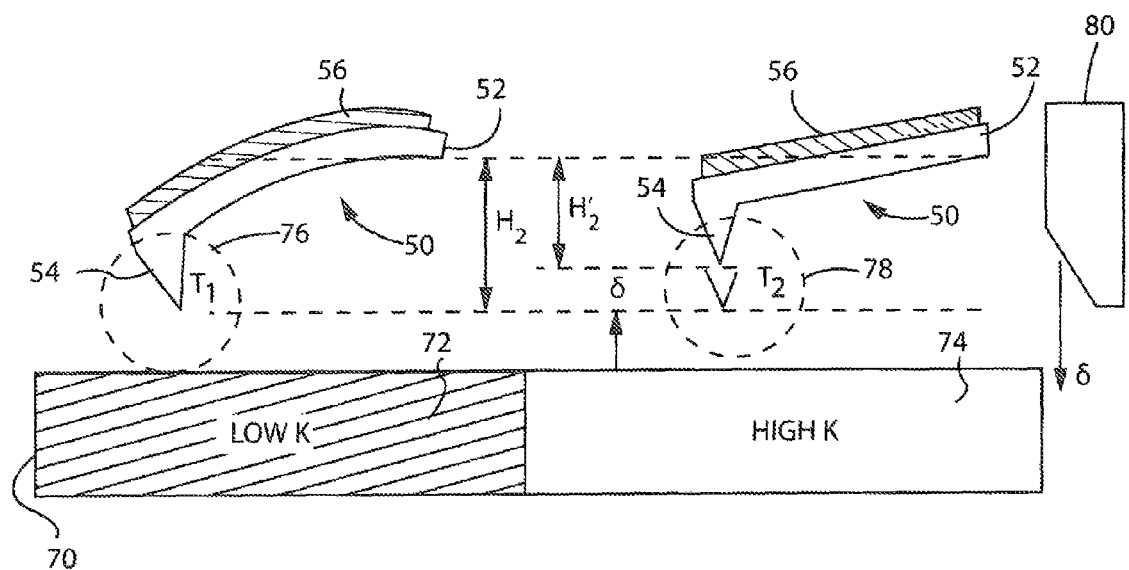
FIG. 3 is a schematic illustration of a bimorph AFM probe interacting with a non-homogeneous sample, and the corresponding response of the control system to a decrease in temperature, moving from right to left.
Figure 4:
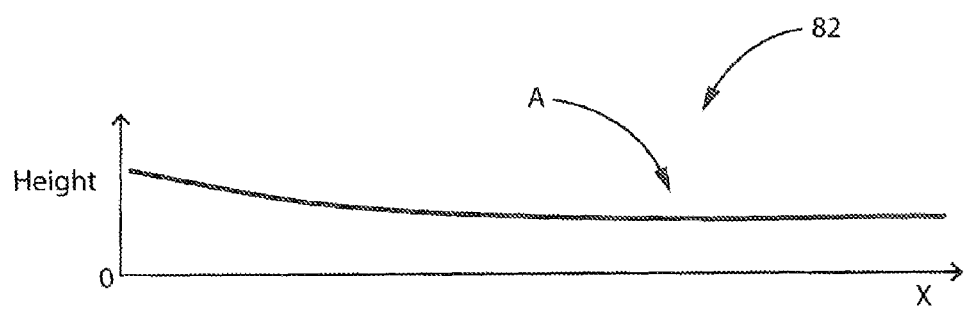
FIG. 4 is an AFM topography plot generated by imaging the sample shown in FIG. 3.

During operation, starting with the illustration to the left, the cantilever will bend downwardly due to the laser heating effect shown in FIG. 3 and described previously. When probe 114 and sample 250 are brought in to engagement, this thermal bending effect is present, and is carried throughout the measurement. Because laser heating is present at probe-sample engagement and throughout the AFM measurement, this bending is constant and thus does not, by itself, present an artifact in the AFM data.

Next, as described in detail previously, the thermal induced bending effect also depends on sample conductivity. In this case. Material A 252 has low thermal conductivity and thus, when probe traverses Material A 252, low thermal dissipation occurs and the thermal induced downward bending of the probe 114 due to laser heating substantially maintains its effect. As the AFM scan continues, and relative probe-sample scan motion causes the probe to traverse sample 250 from a region of higher temperature (generally corresponding to Material A) to a region of lower temperature, $T_2<T_1$ (generally corresponding to Material B), cantilever of probe will gradually bend upwardly. It is notable that in practice the cantilever and the air surrounding the cantilever (e.g., the region of probe-sample interaction) have similar size as the sample comprised of two different materials. There is thus a collective environmental effect (including temperature change) between them. For the example in FIG. 10, for instance, heat is transported from the air surrounding the cantilever to the surface. The result is a gradual change in temperature field.

As probe 114 bends upwardly, AFM control feedback will cause piezoactuator 108 to extend downwardly to compensate for this probe bending, as shown in the rightmost image of the AFM in FIG. 10. Notably, the total height H is fixed and cannot change so, $$H=H_1+H_2+h=H_1'+H_2'+h' \qquad \text{Equation 3}$$

Again, total height H is the total height of the AFM mechanical loop from the scanner top suspension to the sample stage. $H_1$ is the scanner piezo height from the AFM top suspension to the probe base (point O, O'). $H_2$ is the probe height from the probe base O, O' to the probe tip position (at its apex), and h is the sample height from the top of the sample (tip apex position) to sample stage. Considering Equation 2 ($\delta=H_2-H_2'$), $$H_1'=H_1-h'+h+\delta \qquad \text{Equation 4}$$

As discussed throughout, feedback control signals provide the SPM topology data ("SPM scanner measured height") such that the change in scanner measured height is representative of the sample surface. This can be represented by, $$\Delta H_1=-(H_1'-H_1)=h'-h-\delta \qquad \text{Equation 5}$$

However, to obtain the true topology of the sample surface, Δh, thermal bending must be taken in to account, $$\Delta h=h'-h=\Delta H_1+\delta \qquad \text{Equation 6}$$

With a flat sample as in FIG. 10, in which h (sample height) does not change (h'−h=0) the amount that the piezoactuator extends downwardly ($\Delta H_1$) must equal the amount of thermal induced bending, δ (equal and opposite). Therefore, the true topology is $\Delta h=h'-h=\Delta H_1+\delta$ (where δ can be negative (downward bending with an increase in temperature) or positive (upward bending with decreased temperature)). If there is no thermal artifact, then δ=0, and the AFM measured topology equals the true topology. But with the presence of thermal artifact, the AFM measured topology is distorted by the cantilever thermal bending, with $\Delta H_1=\Delta h-\delta$.

An illustration of deflection versus scan position (x, for example) for the case presented in FIG. 10 is shown in FIGS. 11A-11C. FIG. 11A is the thermal induced DC cantilever bending δ. Again, $\delta=H_2'-H_2$, where $H_2$ is the probe height. This is determined as described above in connection with FIGS. 9A-9B. In this case, the cooling effect of the high thermal conducting portion of the sample leads to upward deflection as the AFM scans the sample from left to right, as illustrated. FIG. 11B is the AFM measured topology $\Delta H_1$, where $H_1$ is the piezo scanner height, and $\Delta H_1=H_1'-H_1$. Moving to a region of lower temperature (with corresponding probe bending upwardly), the measured AFM data illustrates a decrease in height, as expected. Finally, in FIG. 11C, the true sample topology, Δh, is illustrated; namely, Δh=h'−h, where h is the sample height, $\Delta h=\Delta H_1+\delta$. In the FIG. 10 case, in which the sample is flat, h'−h=0, and $\Delta H_1=-\delta$. FIG. 11C shows the true topology as flat (zero height), which can be generated by adding the DC bending profile (FIG. 11A—measured as discussed in connection with FIGS. 9A-9B), to the AFM measured topology (FIG. 11B—provided by the AFM feedback control). Again, FIG. 11A provides an indication of the thermal profile of the sample.

As suggested previously, in practice, the cantilever and the air surrounding the cantilever have similar size as the sample which includes two different materials 252, 254. There is thus a collective environmental effect (including temperature change) between them. For the example, in FIG. 10, heat is also transported from the air surrounding the cantilever to the surface. The result is a gradual change in temperature field starting at a first scan position to the left (when moving from left to right in the figures), prior to the scan reaching the actual transition in materials (A to B) of the sample, and their respective conductivities.

Turning to FIG. 12, a schematic diagram of AFM operation to image a sample 300 with an active heater 302 is shown. An example is AFM imaging during heat-assisted magnetic recording (HAMR). HAMR is a magnetic recording technology that records data using laser thermal assistance to heat the material, and provides a good illustration of the value of the present technique. Due to local laser heating, the cantilever will bend down further near the location of the sample corresponding to the heater, where $T_2$ (HAMR heater location)>$T_1$ (locations along the scan line independent of the heat source). Similar to FIG. 10, the AFM control feedback will respond; however, unlike the cooling condition of FIG. 10 in which piezo actuator 108 extends, piezo actuator 108 in the FIG. 12 case will retract to compensate this probe bending (downwardly) so that the total height H will not be changed, with H=$H_1$+$H_2$+h=$H_1'$+$H_2'$+h'. Note that probe bending prior to AFM (piezo actuator) response is not shown in FIG. 12 for clarity reasons—i.e., FIG. 12, on the right side illustration (scan direction), shows both probe 114 bending downwardly from its left side position (shown in phantom on the right) and retraction of actuator 108.

The true topology is therefore given by, $\Delta h$=h'-h=$\Delta H_1$+$\delta$. In this case, in addition to localized heater 302, the sample topography is non-zero. Data corresponding to this measurement is provided in FIGS. 13A-13C. If there is no active beat source, then $\delta$=0, and the AFM measured topology equals the true topology, with $H_1$=$\Delta h$. But with the presence of thermal artifact, the AFM measured topology is distorted by the cantilever thermal bending, with $\Delta H_1$=$\Delta h$-$\delta$.

FIG. 13A is a thermal induced DC cantilever bending profile given by $\delta$. Again, $\delta$=$H_2'$-$H_2$, while $H_2$ is the probe height. FIG. 13B is the AFM measured topology $\Delta H_1$, $\Delta H_1$=$H_1'$-$H_1$. $H_1$ is the piezo scanner height. Again, as expected, as region 302 beats the probe/measurement location, probe 114 bends downwardly, which presents itself as an increase in measured sample height in the AFM data. FIG. 13C is the true sample topology $\Delta h$, $\Delta h$=h'-h, where h is the sample height, $\Delta h$=$\Delta H_1$+$\delta$. As noted with respect to the FIG. 10 case, by adding the DC bending or deflection profile (which provides an indication of the thermal profile of the sample) to the AFM measured topology, the preferred embodiments are able to determine the true sample topology.

In sum, using the mean deflection illustrated in FIGS. 9A and 9B, the true sample height can be determined, while also providing a measure of the temperature distribution when using a coated bimorph probe. In this latter regard, FIG. 13A shows a heat induced thermal bending profile (higher temperature leading to downward deflection of the probe and a larger probe height, $H_2$) located as expected, at a region 304 corresponding to region 306 (FIG. 13B of the measured AFM height illustrating larger than actual surface height (topography) due to the thermal artifact).

The techniques described herein are useful for overcoming the limitations of AFM when imaging surface features having low conductivity regions and higher conductivity regions. In this way, the AFM is able to resolve substantially artifact free nanoscale surface topology, including their thermal profiles over such regions.

Figure 14:
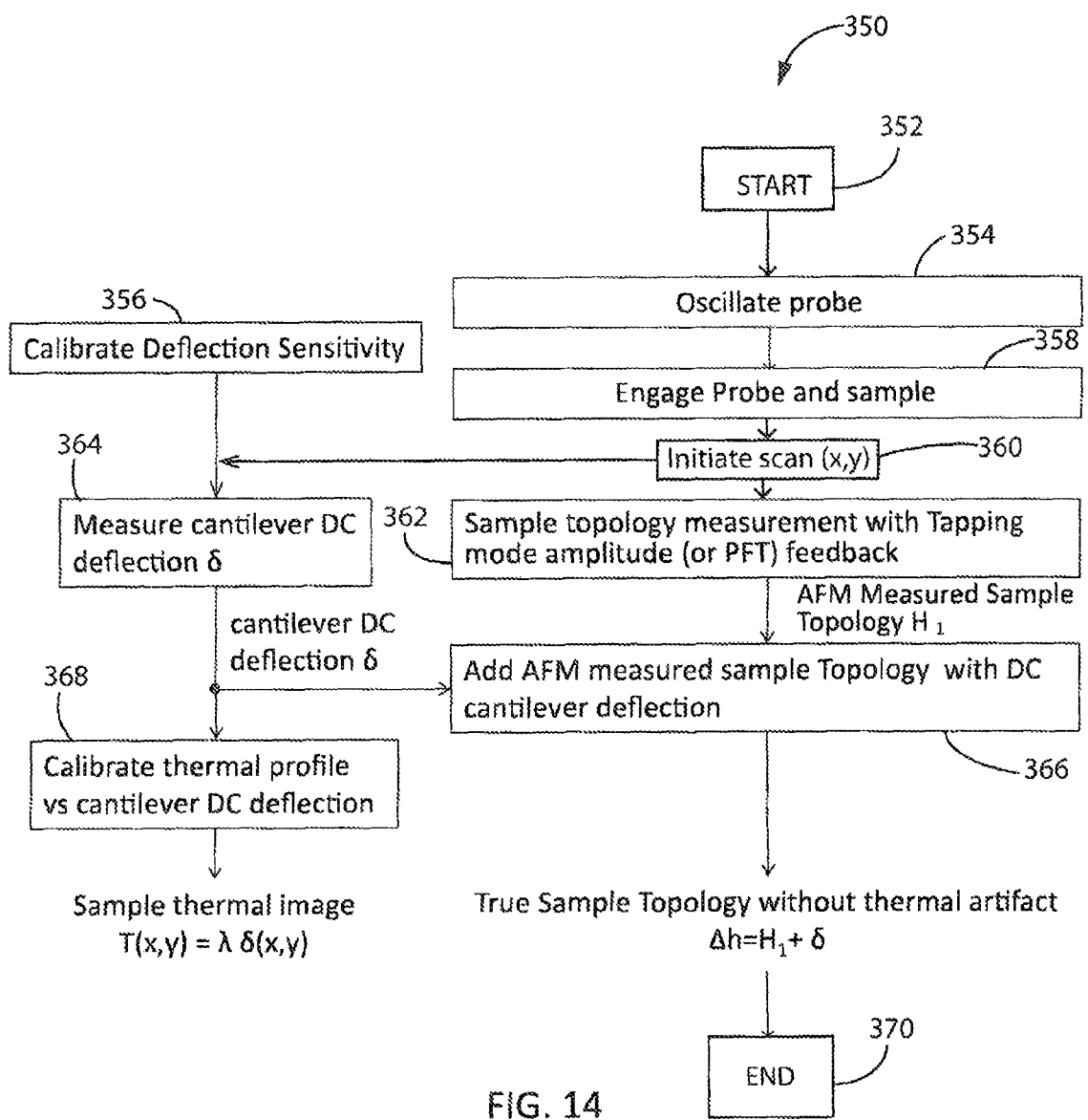
FIG. 14 is a flow diagram illustrating a thermal compensation method according to a preferred embodiment.

FIG. 14 is a block diagram illustrating a method 350 according to a preferred embodiment of the present invention. After a start-up and initialization step in Block 352, method 350 oscillates the probe (such as a bimorph probe) in Block 354, for example, using TappingMode™ or PFT Mode feedback. In Block 356, method 350 calibrates the detection sensitivity. This is typically performed at a large probe sample separation distance where thermal effects (due to laser heating or imaging an inhomogeneous sample) are not present. The reflected laser is preferably substantially centered on the photodetector of the optical deflection detection apparatus, and that location is set to correspond to zero DC deflection, $A_0$ as described previously. Next, in Block 358, an engage operation is performed to cause the probe and sample to interact.

A sample scan is then begun in Block 360 as the AFM begins to collect surface data in conventional fashion in Block 362, again in an oscillating mode of operation such as PFT Mode. More particularly, the AFM detects motion of the probe, which may include monitoring at least one of the amplitude of a probe oscillating near its fundamental resonant frequency (TappingMode™), a peak force when oscillating below resonance (Peak Force Tapping® Mode), or torsional oscillating amplitude (TR Mode). Substantially simultaneously, average cantilever deflection, which provides an indication of the thermal induced deflection of the probe, is recorded for each scan position in Block 364 using the calibration performed in Block 356. Typically, a force-distance curve ramp is generated on a hard sample, such that the measured slope gives the optical deflection sensitivity (i.e., move the Z-actuator a certain amount (for example, "X" nanometers), and record voltage to determine a nm/V conversion factor). This conversion can then be used to convert the DC component of the cantilever deflection (FIGS. 9A and 9B) from volts to nanometers, thereby providing a method of converting the cantilever shape change (namely the DC component of probe/cantilever shape change) to a displacement (e.g., FIG. 11A). Thereafter, average probe deflection and sample topography may be plotted. Finally, the average probe deflection data is combined with the topography data (e.g., FIG. 11B) to reconstruct an image of the sample surface with the thermal induced deflection artifact removed (e.g., FIG. 11C) in Block 366. Method 350 is then terminated in Block 370.

Optionally, in Block 368, method 350 can calibrate the thermal profile versus DC cantilever deflection to generate a sample thermal image, T(x, y)=$\lambda$*$\delta$(x, y) (see, for example, exemplary DC deflection (temperature) profiles in FIGS. 11A and 13A). For instance, the cantilever can be placed in an environment with a controlled or known temperature change while measuring the cantilever DC deflection variation, thereby providing an indication of degree temperature change per nanometer of DC deflection. The measured DC cantilever deflection during AFM operation (converted to a displacement (nm) using the above-described nm/V conversion factor) can use this calibration to generate a temperature profile (e.g., in degrees C.). Also note that while method 350 has been described as collecting the AFM and DC deflection data and combining the corresponding data post scan, the combination (e.g., addition) operation of Block 366 could be performed on a point-by-point scan position basis to provide a real time indication of the true sample surface topology. Notably, bending or deflection of bimorph cantilevers are very sensitive to the local temperature change, 1 degree C. change in temperature can cause 43 nm vertical displacement (see, e.g., "Study of the Origin of Bending Induced by Bimetallic Effect on Microcantilever", Daniel Ramos, Johann Mertens, Montserrat Calleja and Javier Tamayo, Sensors 2007, 7, 1757-1765).

Figure 15A:
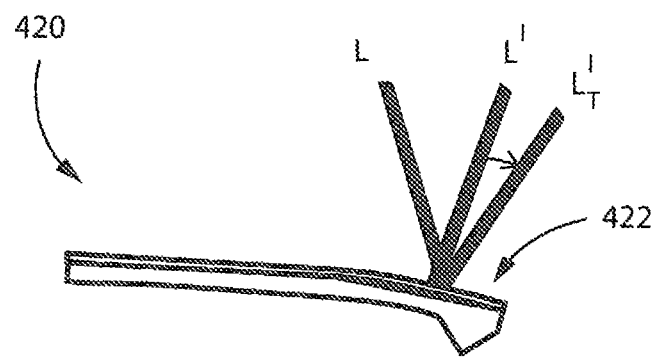
FIGS. 15A and 15B illustrate an alternate embodiment to compensate for thermal induced deflection using a probe coated on both sides (top and bottom)
Figure 15B:
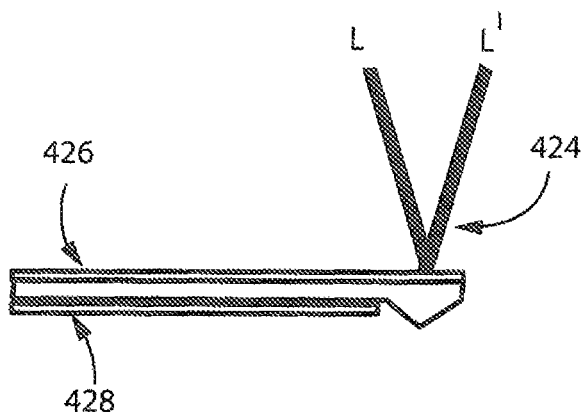

To avoid the thermal bending artifact when using bimorph probes in AFM, an alternative probe may be employed. As shown in FIG. 15A, when using a bimorph probe 420 having a single-sided to layer coating, thermal induced bending of the lever is observed. In particular, while incoming laser beam "L" is typically reflected from the backside of the lever of probe 420 along path L', thermal induced bending of the lever (bending downwardly due to a temperature increase in this case) causes the beam to be reflected along path $L_T$'. By coating a probe 424 on both sides 426, 428 with a dual layer coating, probe 424 is able to physically reduce this thermal induced bending effect, as shown in FIG. 15B. The reflected laser beam is able to traverse a path representing actual probe-sample interaction (L') rather than a path which includes an additional thermal deflection component ($L_T$').

Figure 16:
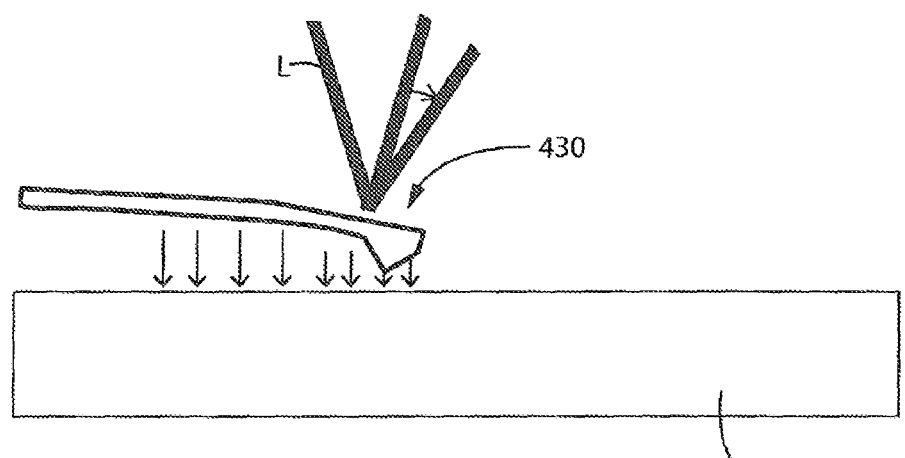
FIG. 16 is a schematic illustration of a deflection artifact similar to the thermal induced deflection, but caused by background factors other than temperature.

Next, as shown in FIG. 16, though the preferred embodiments are primarily directed to compensating for the thermal induced bending effect described throughout, a similar artifact (which manifests itself as a change in probe height $H_2$ (FIGS. 7, 8, 10 and 12)) is observed when physical background forces act on the AFM probe. For instance, long range forces can have a bending effect independent of actual probe-sample interaction, including electrostatic and magnetic forces, illustrated in FIG. 16 as causing a downward bending of a probe 430 relative to a sample 432. This bending or deflection of the probe also causes a corresponding translation of the reflected laser beam of the optical deflection detection scheme of the AFM, as shown and described previously.

Figure 17:
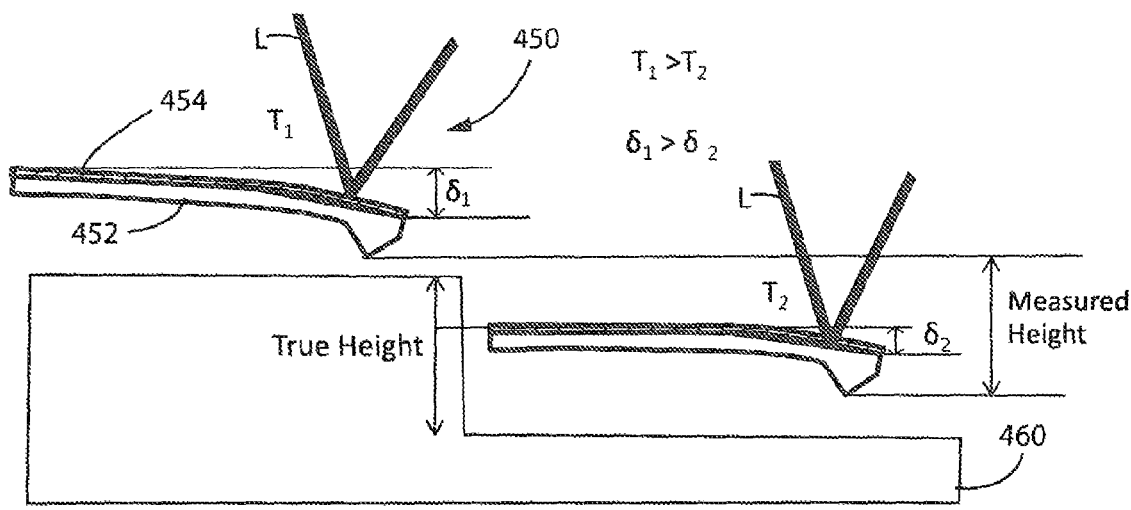
FIG. 17 is a schematic illustration of an AFM probe traversing a step in a sample, and the corresponding artifact due to thermal induced deflection.

With reference to FIG. 17, it has been determined that, due to the thermal induced bending effect, a bimorph probe 450 with a single-sided coating 454 on its cantilever 452 can exhibit a measured sample height that is up to 4% off from true sample height. In this case, when in the ambient condition, laser beam "L" heats probe 450 such that its temperature changes from $T_0$ to $T_1$, with $T_1 > T_0$, causing it to bend downwardly. Thereafter, when probe 450 engages sample 460, sample 460 acts as a heat sink causing probe 450 to bend upwardly, back toward its neutral position (cooling effect, $T_1 > T_2 > T_0$, but in this case not all the way back, to a downward deflection amount $\delta_1$. As the probe traverses the sample step, from left to right, the cantilever 452 comes closer to the sample and sample 460 conducts more heat, causing further upward deflection, such that $\delta_2 < \delta_1$. In the end, the measured AFM data (measured height—where tip interacts with surface) will characterize the sample surface with a height less than the actual step height (true height), as shown.

Figure 18A:
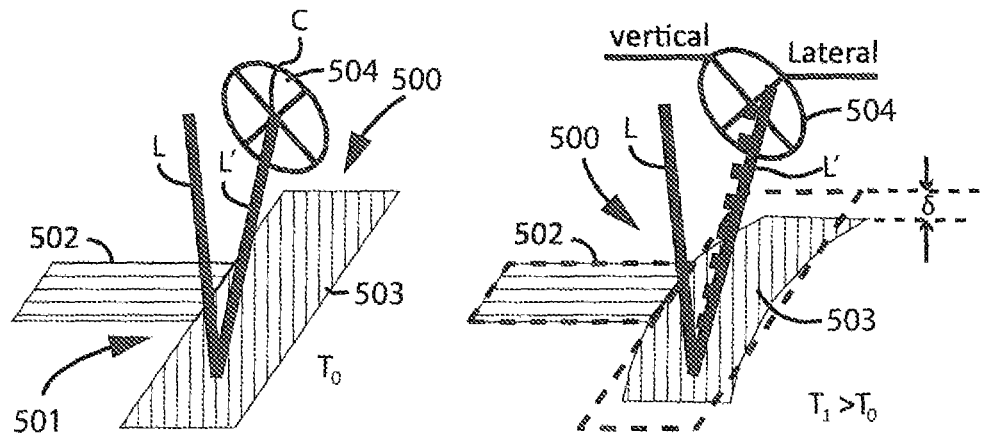
FIGS. 18A and 18B are schematic diagrams illustrating lateral bending at an increased temperature condition $T_1>T_0$ (FIG. 18A), and both lateral and vertical bending combined at an increase temperature condition $T_1>T_0$ (FIG. 18B).

The temperature induced cantilever bending is not limited to the vertical direction. FIG. 18A shows thermal bending of a torsional probe 500. At ambient temperature $T_0$, torsional probe 500 is flat and laser L is deflected as L' to a center "C" of a photodiode 504. For this torsional probe 500, the metallic coating is only on a top transverse portion 503 of a cantilever 501 of probe 500, while a longitudinal beam 502 of lever 501 is not coated. When the temperature increases to $T_1$, with $T_1 > T_0$, transverse portion 503 of cantilever 501 will change its shape (i.e., bend, for example, an amount $\delta$), and the deflected laser L' will be offset laterally and results in a torsional deflection signal. The corresponding vertical and lateral axes of quadrant photodetector 504 are shown in FIG. 18A (and FIG. 18B, discussed immediately below).

Figure 18B:
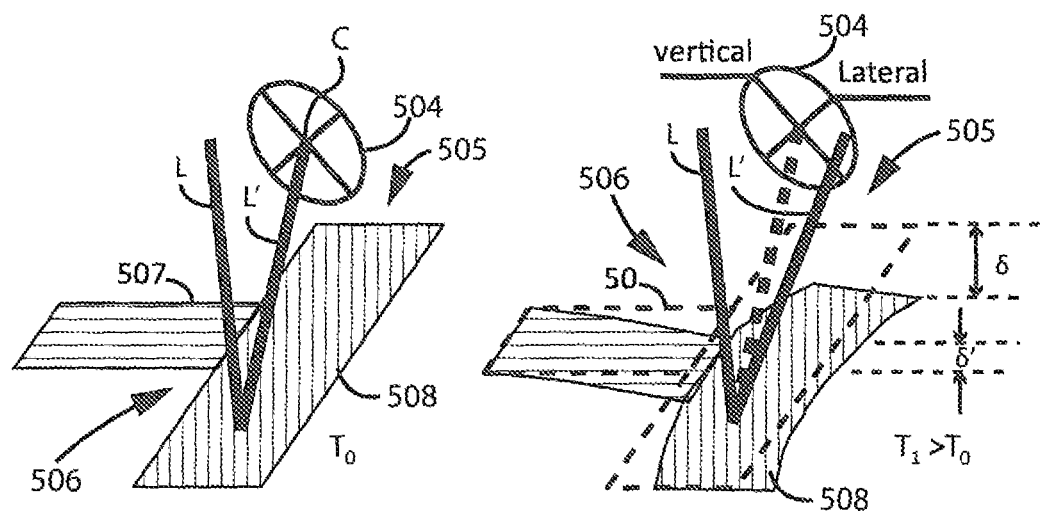

In another case, as shown in FIG. 18B, the whole cantilever 506 (i.e., both a longitudinal portion 507 and a transverse portion 508) of a bimorph probe 505 is coated with metal. In this case, with the temperature increase, $T_1 > T_0$, the laser detector system detects both vertical (e.g., an amount $\delta'$ of thermal induced vertical deflection corresponding to the cantilever shape change, i.e., the DC component thereof) and torsional signal (e.g., an amount $\delta$ of thermal induced torsional deflection corresponding to the cantilever shape change). In each case (FIGS. 18A and 18B), this torsional deflection can also be used to measure the temperature profile in the same way as described above in connection with the other preferred embodiments (namely, FIGS. 9A-B).

Also, the thermal induced torsional bending is not limited to the torsional probe. With an arbitrary shape of the probe, due to its geometric shape, the inhomogeneous coating and other factors, the cantilever torsional bending (i.e., cantilever shape change) can be observed with the temperature change.

In sum, the preferred embodiments are able to account for thermal induced deflection of the probe (background deflection not due to probe-sample interaction) by subtracting the DC deflection of an AFM probe being operated in an intermittent contact mode. Moreover, by plotting the DC deflection versus scan position, a temperature profile of the sample is realized (thermal imaging), as long as proper calibration of the DC deflection is maintained (baseline determination—center of peak to peak deflection).

Although the best mode contemplated by the inventors of carrying out the present invention is disclosed above, practice of the above invention is not limited thereto. It will be manifest that various additions, modifications and rearrangements of the features of the present invention may be made without deviating from the spirit and the scope of the underlying inventive concept.

The invention claimed is:

1. A method of compensating for a thermal deflection artifact of a probe of a scanning probe microscope (SPM) operating in an oscillating mode, the method comprising:
   generating relative oscillating motion between a probe and a sample;
   providing relative scanning motion between the probe and the sample;
   detecting motion of the probe as the probe and the sample interact during the providing step;
   controlling probe-sample proximity based on the detected motion, the controlling step generating SPM scanner measured height;
   determining a DC component of a cantilever shape change during the scanning step;
   converting the DC component to a displacement; and
   adding the displacement with the SPM scanner measured height at each scan location to generate an SPM image in which the thermal deflection artifact is compensated.

2. The method of claim 1, further comprising calibrating a detector used during the detecting step.

3. The method of claim 2, wherein the calibrating step includes generating a force-distance curve on a known sample so as to generate a conversion factor (nm/V).

4. The method of claim 1, wherein the displacement is at least one of vertical displacement and lateral displacement.

5. The method of claim 1, wherein the controlling step includes using an intermittent contact mode of SPM operation.

6. The method of claim 5, wherein the intermittent contact mode is at least one of tapping mode, peak force tapping (PFT) mode and torsional resonance (TR) mode.

7. The method of claim 1, further comprising generating a temperature profile of the sample using the displacement.

8. The method of claim 7, further comprising plotting the displacement at each scan location to generate the temperature profile.

9. The method of claim 7, wherein the generating a thermal profile step includes calibrating the DC cantilever deflection to a known temperature change.

10. A method of generating a temperature profile of a sample, the method comprising:
   generating relative oscillating motion between a probe and a sample;
   providing relative scanning motion between the probe and the sample;
   detecting motion of the probe as the probe and the sample interact during the providing step;
   controlling probe-sample proximity based on the detected motion so as to generate AFM scanner measured height;
   determining a DC component of cantilever shape change; and
   wherein the DC component of cantilever shape change indicative of a temperature profile of the sample surface.

11. The method of claim 10, wherein the controlling step includes using an intermittent contact mode of SPM operation.

12. The method of claim 11, wherein the using step includes monitoring at least one of an amplitude of the relative oscillation near resonance and a peak force when the relative oscillation is below resonance.

13. The method of claim 12, wherein the intermittent contact mode is at least one of tapping mode, peak force tapping (PFT) mode and torsional resonance (TR) mode.

14. The method of claim 10, further comprising calibrating a detector used during the detecting step.

15. The method of claim 14, wherein the calibrating step includes generating a force-distance curve on a known sample so as to generate a conversion factor (nm/V).

16. The method of claim 10, wherein the displacement is at least one of vertical displacement and lateral displacement.

17. The method of claim 10, wherein the converting step includes calibrating the DC cantilever deflection to a known temperature change.

* * * * *